United States Patent

Harrington et al.

(10) Patent No.: US 6,185,013 B1
(45) Date of Patent: Feb. 6, 2001

(54) COLOR PRINTING HAVING A PLURAL HIGHLIGHT COLOR IMAGE MAP IN A FULL COLOR IMAGE

(75) Inventors: Steven J. Harrington; R. Victor Klassen, both of Webster, NY (US)

(73) Assignee: Xerox Corporation, Stamford, CT (US)

(*) Notice: Under 35 U.S.C. 154(b), the term of this patent shall be extended for 0 days.

(21) Appl. No.: 08/773,229

(22) Filed: Dec. 23, 1996

(51) Int. Cl.[7] ....................................................... G03F 3/08
(52) U.S. Cl. ............................................. 358/520; 358/523
(58) Field of Search ................................. 358/518, 520, 358/523, 525, 527, 500, 501, 504; 395/101, 109, 108, 117; 382/167, 162, 163, 165; 348/488, 603; 399/54, 28

(56) References Cited

U.S. PATENT DOCUMENTS

| | | | |
|---|---|---|---|
| 4,554,241 | * 11/1985 | Edwards ................................ 430/301 |
| 4,670,780 | * 6/1987 | McManus et al. ...................... 358/80 |
| 4,682,186 | * 7/1987 | Sasaki et al. ..................... 346/140 R |
| 4,761,669 | * 8/1988 | Langdon ................................... 355/4 |
| 4,894,665 | * 1/1990 | Davis ...................................... 346/1.1 |
| 4,907,078 | * 3/1990 | Hasebe .................................... 358/81 |
| 4,908,779 | * 3/1990 | Iwata ..................................... 364/518 |
| 5,237,517 | * 8/1993 | Harrington et al. ................. 364/526 |
| 5,243,414 | * 9/1993 | Dalrymple et al. .................. 358/500 |
| 5,390,035 | * 2/1995 | Kasson et al. ........................ 358/525 |
| 5,416,848 | * 5/1995 | Young ................................... 382/191 |
| 5,517,334 | * 5/1996 | Morag et al. ........................ 358/518 |
| 5,537,228 | * 7/1996 | Dillinge ................................ 358/520 |
| 5,557,393 | * 9/1996 | Goodman et al. ............... 355/326 R |
| 5,615,320 | * 3/1997 | Lavendel .............................. 395/131 |
| 5,668,636 | * 9/1997 | Beach et al. ......................... 358/296 |
| 5,691,779 | * 11/1997 | Yamashita et al. .................. 348/645 |

* cited by examiner

Primary Examiner—Madeleine Nguyen
(74) Attorney, Agent, or Firm—Oliff & Berridge, PLC

(57) ABSTRACT

Mapping of full color images to two-highlight color images which provides excellent results for both pictorial image and presentation graphics applications is described. Shades and tints for each hue in the original full color image are mapped to a corresponding triangle of colors in a tetrahedral of possible colors defined by the two highlight colors. The apex of the triangle of colors is varied within the tetrahedral of possible colors according to hue. Differentiations in the result colors for the fully saturated cases is provided while preserving the relative saturation and lightness behavior. The triangle of colors maps to a first triangle bordering one side of the tetrahedral, the first triangle corresponding to a first one of the highlight colors or a second triangle bordering another side of the tetrahedral, the second triangle corresponding to a second one of the highlight colors when the hue of the original colors matches one of the highlight hues. Mappings may be provided for printers using arbitrary highlight colors. The mappings preserve information important to the viewer without discarding dimensions of the color space. Different information can be preserved depending upon the particular application.

11 Claims, 7 Drawing Sheets

COLOR PRINTING HAVING A PLURAL HIGHLIGHT COLOR IMAGE MAP IN A FULL COLOR IMAGE

BACKGROUND OF THE INVENTION

1. Field of the Invention

This invention relates to color printing having a plural highlight color image mapped from a full color image. More particularly, this invention is directed to multiple highlight color printing which preserves information important to the viewer.

2. Description of the Related Art

Color images are a significant element in today's printing industry. As a result, electronic color printers and color image creation tools have been increasingly developed to obtain color images using electronic printing methods. Color printing is often performed using full color. The gamut of colors includes tints and shades of a full color spectrum—reds, greens, blues and their combinations.

A significant amount of color printing, however, can be performed using highlight color printing rather than full color printing. In highlight color printing, when a single highlight color is used, only two inks are used in the printing process. These inks are black and a highlight color, which is often red or blue. Electronic printers may be designed specifically for highlight color printing. A highlight color printer is generally faster and less expensive than a full color printer, as only two inks are processed, rather than the three or four inks which must be processed in order to obtain full color images.

The gamut of full colors is a three-dimensional volume which can be represented by the double hexagonal cone 10 illustrated in FIG. 1. In this representation, shades vary from dark to light as one moves upwards from the black vertex. Tints vary from unsaturated grays to fully saturated colors as one moves out radially from a central axis. Hues vary as one moves angularly in a horizontal plane.

The gamut of colors available to a single highlight color printer can be represented by the two-dimensional triangle 13 illustrated in FIG. 2. This is a slice from the full color double-hexagonal cone of FIG. 1 at the angle of the highlighted hue.

Prior attempts to print a full color image on a highlight color image involve mapping the three-dimensional double hexagonal cone of FIG. 1 to a two-dimensional triangular slice of colors within the double-hexagonal cone. The highlight color printer attempts to render the highlight color image by mapping the full color specification onto the set of colors which it can produce. In this mapping, many different colors in the full color space are mapped to the same color in the highlight color space. This information important to the viewer is often lost.

U.S. Pat. No. 4,554,241 to Edwards discloses a method of printing a realistic image of an original on a sheet. Two printing plates are used to print different impressions with two different coloring media.

U.S. Pat. No. 4,636,839 to Cole et al. discloses a method and an apparatus for generating color matte signals. RGB color components are calculated from hue, saturation and luminance value inputs. A new luminance value Y and color difference components CR and CB are calculated from these RGB values. Various algorithms are disclosed which are used for color calculation.

U.S. Pat. No. 4,670,780 to McManus et al. discloses a method for matching hard copy colors to display colors for registered ink jet copiers. A color transformation for matching hard copy color to display color includes an MSW color space which restricts the hard copy color to certain percentages of binary mixtures of inks (M), single inks (S) and paper white (W). Color data in the XYZ space is converted to the MSW space. Unreachable display colors are matched into reachable hard copy colors. Corrections for color shifts due to interactions of the inks are also disclosed.

U.S. Pat. No. 4,761,669 to Langdon discloses an electrophotographic highlight color printing machine in which printing is done in at least two different colors. Methods for transferring multiple color images simultaneously are disclosed.

U.S. Pat. No. 4,682,186 to Sasaki et al. discloses a method for forming a color image. The color image is formed by using a plurality of coloring materials and controlling quantities of the coloring materials. When a density to be reproduced exceeds the density reproducible for that coloring material, the quantities of other coloring materials are reduced.

U.S. Pat. No. 4,907,078 to Hasebe discloses a method of reproducing color images. Two charge-coupled devices of different wavelengths are used to scan a full color document. The outputs of the charge-coupled devices are fed into a lookup table to determine the appropriate color in a two-color system. The output from the table is then recorded on a piece of paper. The system can be used for any type of copier.

U.S. Pat. No. 4,894,665 to Davis discloses a method of generating an expanded color set of a low resolution color printer. The four-color printer can be expanded to twelve colors by printing a black dot next to a line to make the line seem darker. Two algorithms are provided for determining whether or not a line is critical and for enhancing a line.

U.S. Pat. No. 4,908,779 to Iwata discloses a display pattern processing apparatus. The system can be programmed to convert a full color image into a number of other formats. An example is shown where an RGB image is converted into a two-color image.

U.S. Pat. No. 5,237,517 to Harrington et al. discloses a method and an apparatus for mapping from a full color specification to a highlight color. The full color image is sent to a highlight printer using only a single highlight color. Harrington shows that mapping to a restricted set of colors entailed a loss of information.

The article entitled, "Reproducing Color Images as Duotones", Joanne Power et al., 1996 SIGGRAPH PROCEEDINGS, pp. 237–248, discloses a method of mapping a full color image to a two-color print. The reference describes utilizing an orthogonal system to define the printable color gamut and then transforms the image colors along two directions and uses parallel projections along the third. The method provides one of the orthogonal directions corresponding to the Y-axis of the XYZ color space and initially transforms in this direction. This method tends to have the effect of reducing the available black values, and therein negatively affects pictorial images.

While these references attempted to map a full color image to a highlight color image, they did not fully account for the need for mapping due to different image types. These different image types include pictorial images and presentation graphic images. These image types typically encode their useful information in different manners.

SUMMARY OF THE INVENTION

This invention provides a method and an apparatus for mapping a full color image to a plural highlight color image while preserving information important to the viewer.

This invention also provides a method and an apparatus for mapping a full color image to a plural highlight color image, where the method and apparatus work with various types of images.

This invention further provides a method and an apparatus for mapping a full color image to a plural highlight color image such that different types of information are preserved in accordance with the type of original image being mapped.

In this invention, mapping full color images to plural highlight color images preserves information which is important to the viewer. This invention uses two-highlight colorants in addition to black. The full color to two-highlight color mapping for pictorial images uses a system that preserves luminance. The highlight colors are used only where they are present in the original image. The amount of a color present in the original image is defined by the chrominance vectors. The chrominance vectors may be obtained by a transformation to a luminance-chrominance space. Given a color source, the amount of highlight colorant in the proposed mapping can be determined. The amount of highlight color ink for each highlight color is based upon a relationship between the chrominance components of the source color and the highlight color and the magnitude of the source chrominance relative to that of the highlight color. Thereafter, the amount of white and black to be contributed to the mapping can be determined.

The mapping for presentation images converts the source color to a special color coordinate system. The transformation also converts both highlight colors to the special color system. Once the colors are converted, the is content of the special color coordinates is analyzed. The amount of highlight colorant is determined and then modified to provide the proper lightness and saturation.

In situations wherein the original image includes both pictorial objects and presentation object types on the same page, the method of the present invention identifies the particular object type at a particular portion of the original full color image and then applies a mapping appropriate for the identified object type.

BRIEF DESCRIPTION OF THE DRAWINGS

The invention will be described in detail with the reference to the following drawings in which like-referenced numerals refer to like elements and wherein.

DETAILED DESCRIPTION OF THE PREFERRED EMBODIMENTS

Figure 1:
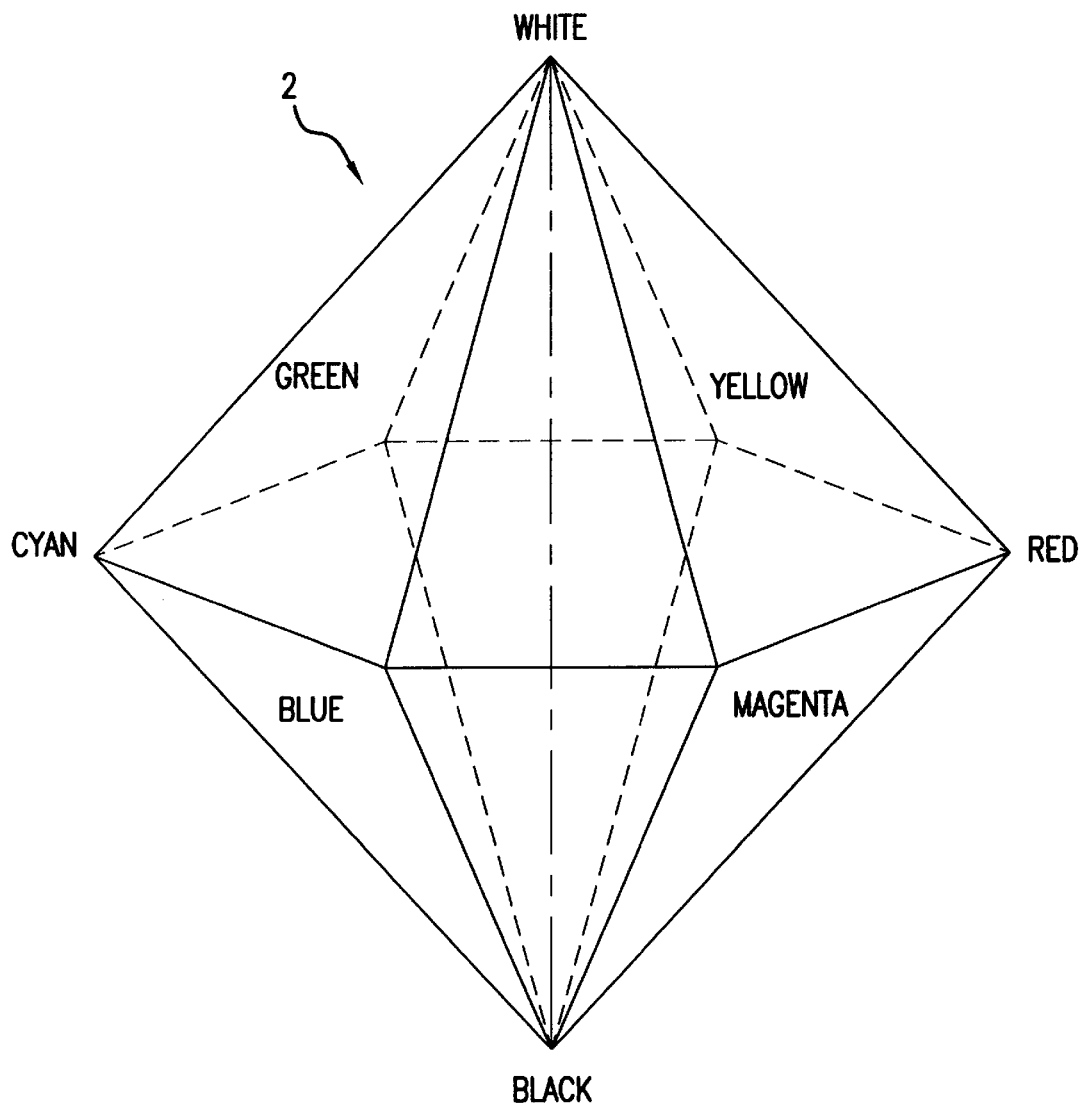
FIG. 1 illustrates the three-dimensional full color space.
Figure 2:
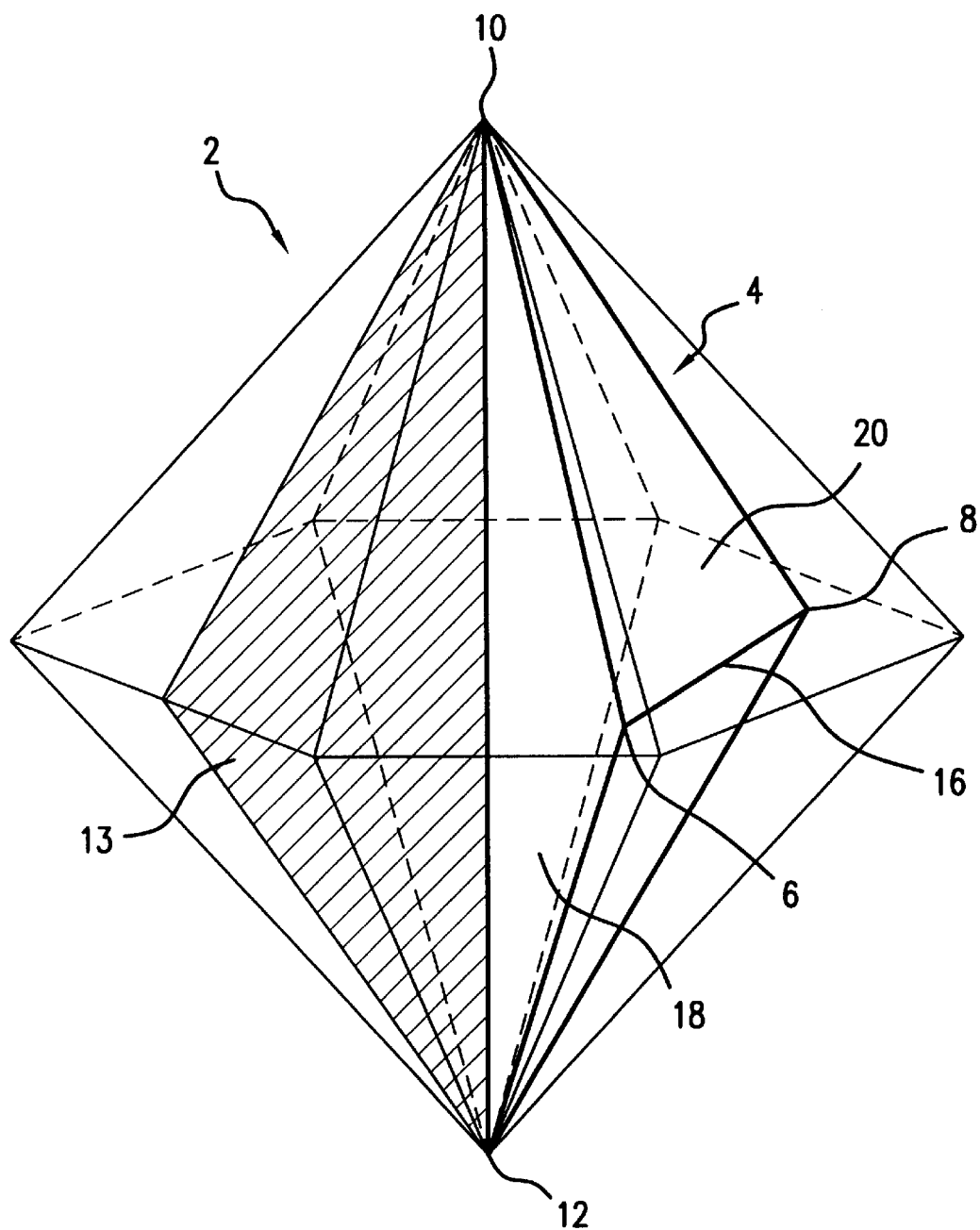
FIG. 2 illustrates the three-dimensional tetrahedral of colors available to a highlight printer.
Figure 3:
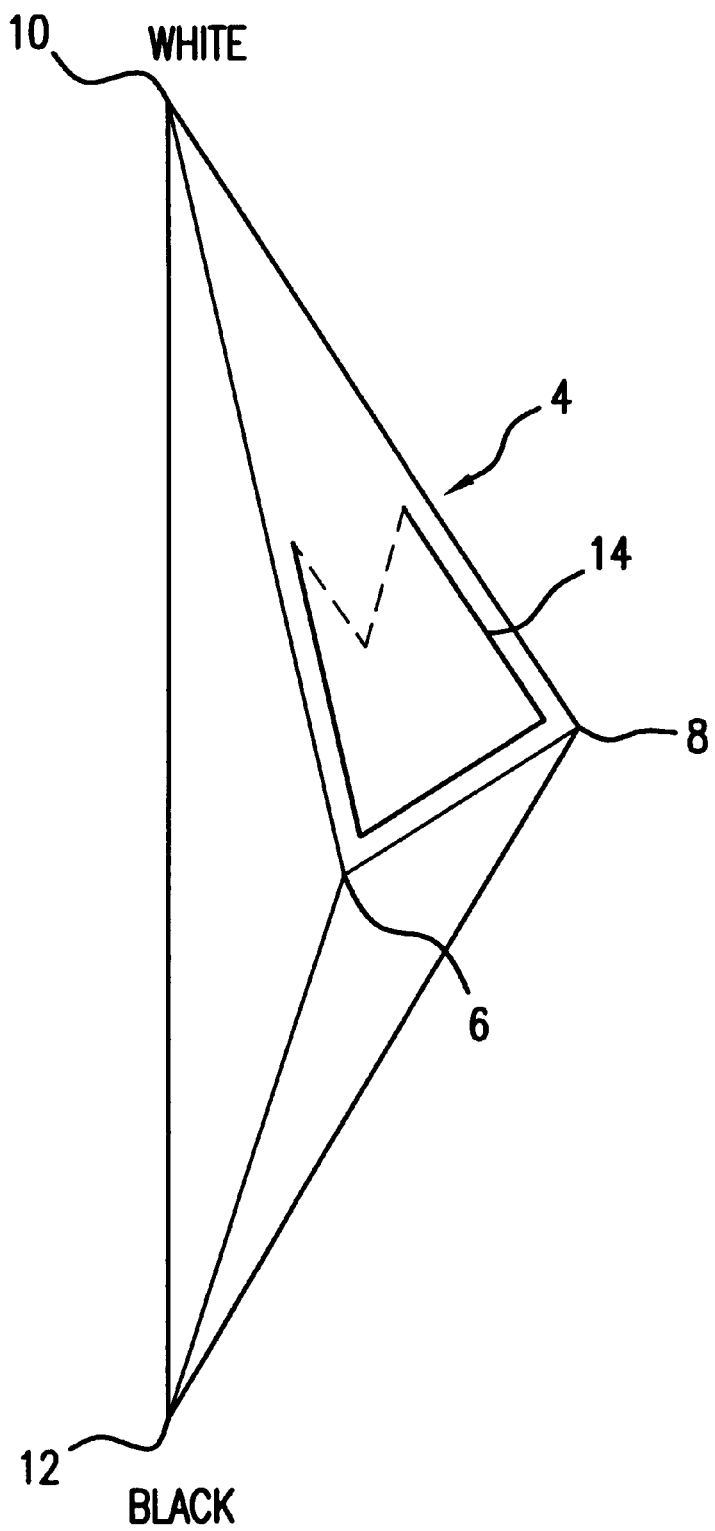
FIG. 3 illustrates a locus of fully saturated colors for two arbitrary highlight colors.

As shown in FIGS. 2 and 3, a tetrahedral section 4 defines the highlight color space 2 of the different colors available to a two-highlight-color printer. The tetrahedral section 4 is bounded on its sides by triangles 18 and 20. The triangles 18 and 20 correspond to the colors that can be produced using black and the first and second highlight colors, respectively. The highlight color triangles 18 and 20 have apexes 6 and 8, respectively. The apex 6 corresponds to the first highlight color. The apex 8 corresponds to the second highlight color. Points 10 and 12 define the amounts of white and black, respectively, available to the two-highlight-color printer.

Figure 4:
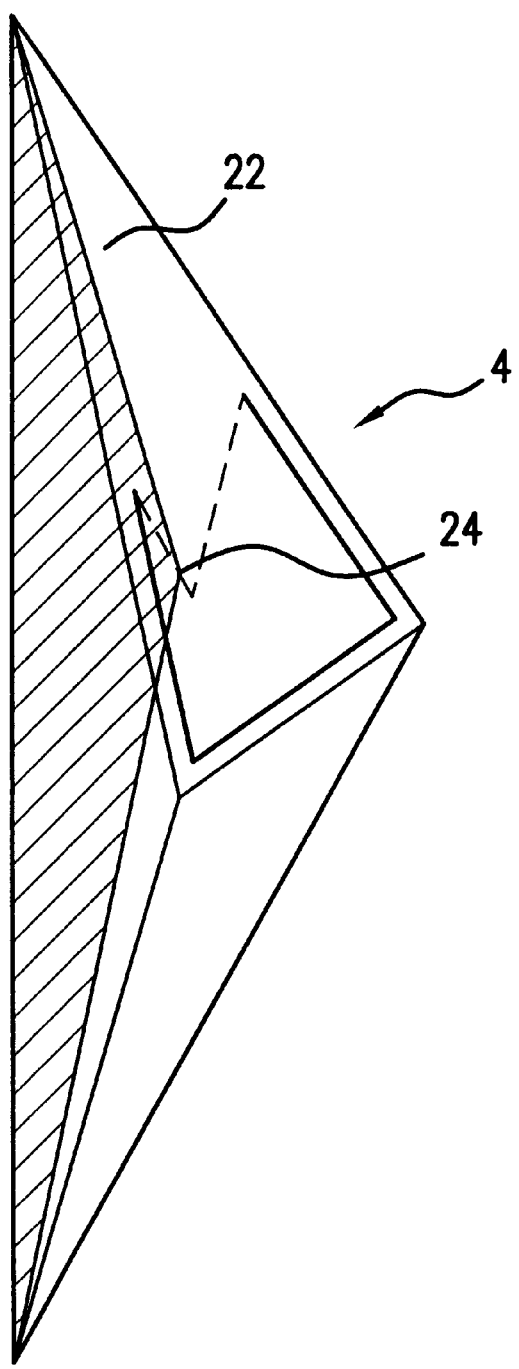
FIG. 4 illustrates a two-dimensional triangle of colors printable by a two-highlight color printer for any given hue.

To preserve information desirable on both presentation graphics applications and pictorial image applications, deriving diverse colors for fully saturated hues in the full color image while still preserving the basic luminance and saturation behavior is desirable. For any given hue, the tetrahedral section 4 of colors will be mapped to a triangular slice of available printer colors 22. As shown in FIG. 4, the fully saturated color for a given hue maps to the apex 24 of the result color triangle 22. The position of the apex 24 varies according to hue. If the hue matches that of one of the highlight colors, the apex 24 of the resulting color triangle 22 will coincide with one of the apexes 6 or 8 of one of the triangles 18 or 20 of the highlight colors. The mapping will be the identity for the triangle corresponding to the highlight color. For other hues, the apex 24 will be at some point within the tetrahedral section 4 of the possible colors. The set of apex points for different hues defines the set of highlight colors generated by the mapping of fully saturated colors.

The information that needs to be preserved depends upon how the color is being used. For pictorial images, most of the information lies in the luminance. For this reason, black and white photographs are easily recognizable. The hue in pictorial images is of secondary importance. For example, it is desirable to view a color image in which the sky is blue, the grass is green and faces are of flesh tones. When color is used to highlight an image, the information derived is from the presence or absence of color rather than a grey level. The colored area with the same luminance as a grey area should look different. Highlight color documents may also vary in this situation.

In presentation graphics, such as graphs and charts, in contrast, most of the information is in the hue. In presentation graphics applications, strongly saturated colors are usually selected for impact, using hue to differentiate the colors. The principles for mapping a presentation graphic from a full color image to a black and two-highlight color image include: (1) keeping colors in either of the highlight hues the same before and after mapping, (2) preserving the relative lightness and saturation behavior of a hue, (3) mapping non-neutral colors to non-neutral colors, and (4) mapping fully saturated colors to a distinct set.

In order to output an image on a black plus two-highlight-color printer from a full color image, the colors in the original image must be mapped from the full color space to the two-highlight-color space. In this invention, none of the colorants should overlap. This arises naturally when using black ink with the two highlight colors. Specifically, this arises because overlapping the highlight color with black simply yields black, rather than producing new colors. Further, this arises when using highlight colors such as red, green and blue, as overlapping these colors generates black. This is unnecessary and redundant when a printer has black ink available.

However, this does not naturally arise when using subtractive inks which remove a narrower portion of the spectrum. These inks include cyan, magenta and yellow. In particular, overlapping these colors produces new colors. The mapping described herein is designed to work for an arbitrary choice of highlight colors. As such, the mapping works under the more restrictive conditions of non-overlapping inks. This approach is taken even though it reduces the gamut of mapped colors over the gamut available for some choices of colors and some printing technologies. However, this is not intended to limit the invention to the more restrictive approach. Highlight colors, which allow for less restrictive conditions, may also be selected for implementing the invention.

When working with presentation graphics images, this invention provides a mapping that initially converts a source color to a special color coordinate system. This special color coordinate system includes three coordinates U, V and W. The first coordinate U defines the strength of the source color in the first highlight color. The second coordinate V defines the strength of the source color in the second highlight color. The transformation converts the first highlight color ($R_{h1}$, $G_{h1}$, $B_{h1}$) to (1, 0, 0) and the second highlight color ($R_{h2}$, $G_{h2}$, $B_{h2}$) to (0, 1, 0), while white (1, 1, 1) is unchanged. The transformation can be expressed as a matrix M, giving the transform color coordinates UVW for a source color $R_S$, $G_S$, $B_S$ as by:

$$[UVW] = [R_S G_S B_S] M,$$

where M is:

$$M = N^{-1} T$$

where $$N = \begin{vmatrix} R_{h1} & G_{h1} & B_{h1} \\ R_{h2} & G_{h2} & B_{h2} \\ 1 & 1 & 1 \end{vmatrix}$$

and $$T = \begin{vmatrix} 1 & 0 & 0 \\ 0 & 1 & 0 \\ 1 & 1 & 1 \end{vmatrix}$$

It should be appreciated that, if the first and second highlight colors are chosen from red, green and blue, the M transformation matrix becomes a simple exchange of coordinates.

This transformation enables the mapping of colors in either of the two-highlight hues onto themselves. However, for highlight colors other than red, green or blue, this transformation can lead to transformed coordinate values outside the range of 0 to 1. The transformed color values can be brought back into the 0 to 1 range by first adding to all three components the value of any component less than 0. Then all three components are divided by their largest component greater than 1. In particular:

1. if (U<0) V=V−U, W=W−U, U=0;
    if (V<0) U=U−V, W=W−V, V=0;
    if (W<0) U=U−W, V=V−W, W=0;
2. if (U>1) V=V/U, W=W/U, U=1;
    if (V>1) U=U/V, W=W/V, V=1;
    if (W>1) U=U/W, V=V/W, W=1.

Figure 5:
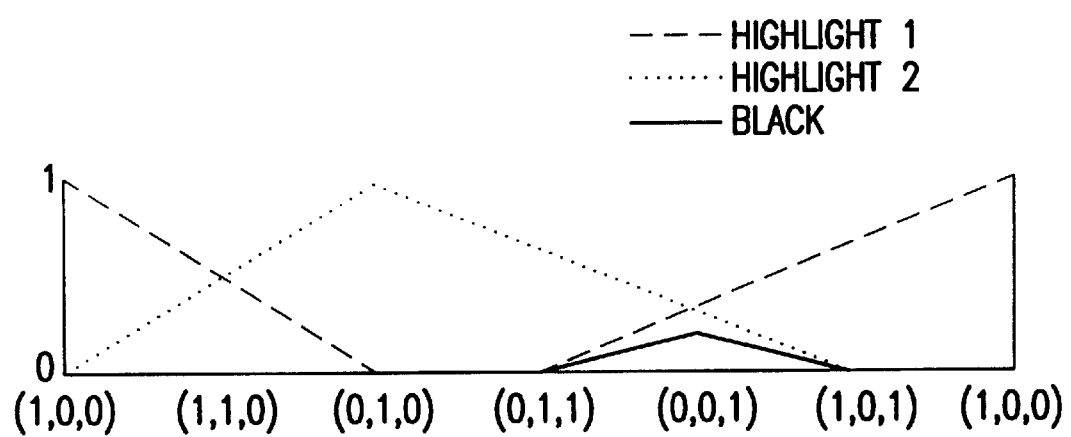
FIG. 5 illustrates a mapping function for the presentation graphics.
Figure 6:
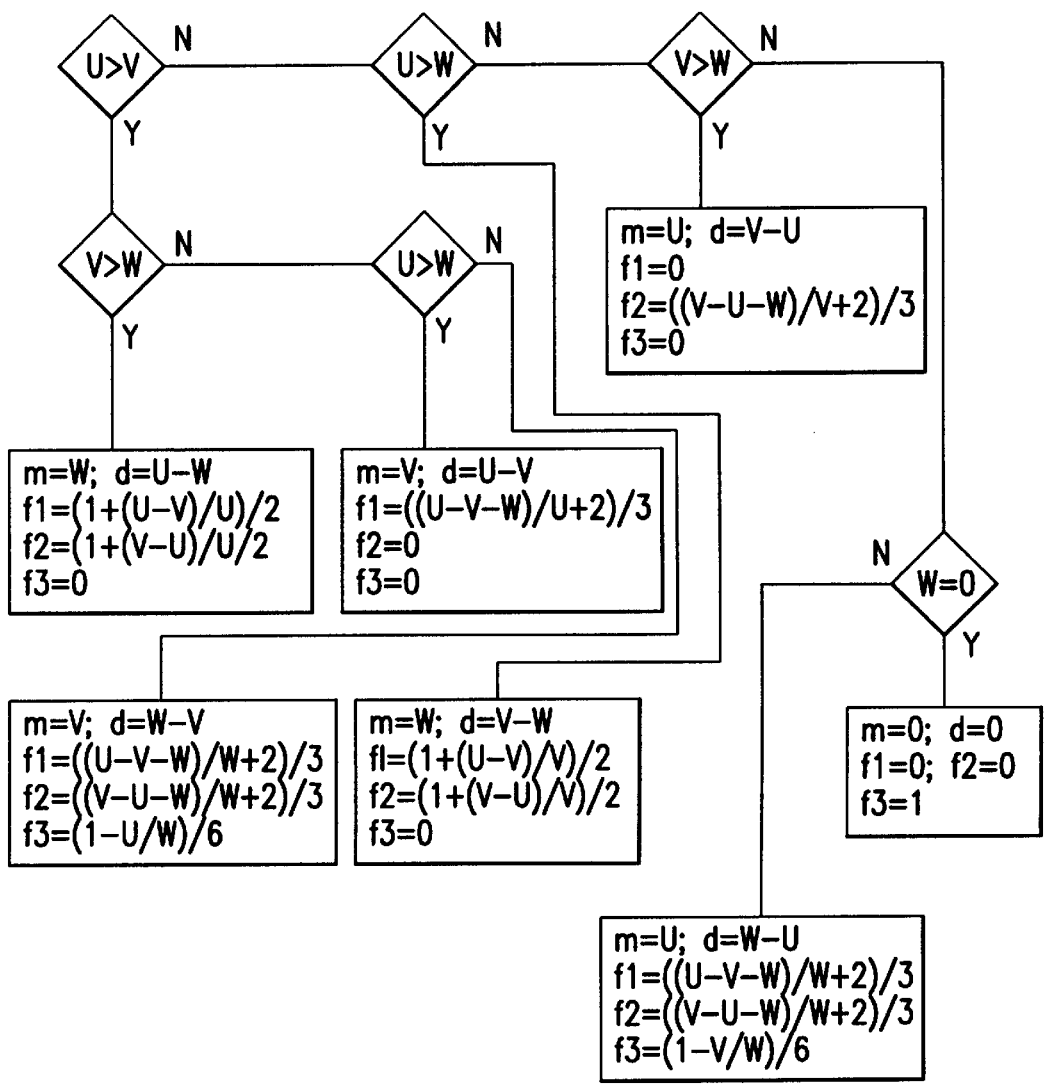
FIG. 6 illustrates a flow chart for implementing a portion of a mapping of the present invention.

It should be noted that if the highlight colors are chosen from the set of red, green and blue, the transformation will leave all colors within the 0 to 1 range. Thus, this clamping stage will not be necessary. Once the source colors are converted to the special color coordinate system, the transformed colors are examined to determine how much white the transformed color contains, how much saturated color the transformed color contains, and the mapping for the most saturated color in the transformed color hue. The mapping for the most saturated color is defined by the amount of each of the three colorants to be used. The mapping used is illustrated in FIG. 5.

The minimum of the three color components of the special color coordinate system is taken as a measure of the amount of white (m) present. The difference between the maximum and the minimum components is used as a measure of the amount of chrominance (d) present. The amount of the first highlight color for the most saturated color is calculated as f1, the amount of the second highlight color as f2, and the amount of black is f3. The calculation is done by dividing the color space into six regions according to the ordering of the color components and then determining the parameters according to the functions for each region. The precise method is given by the following program fragment:

```
if (U > V)
    {if (V > W)
        {m=W; d=U-W; f1=(1+(U-V)/U)/2; f2=(1+(V-U)/U)/2; f3=0;}
    else
        {if (U>W)
            {m=V; d=U-V; f1=((U-V-W)/U+2)/3; f2=0; f3=0}
        else
            {m=V; d=W-V; f1=((U-V-W)/W+2)/3; f2=((V-U-W)/W+2)/3; f3=(1-U/W)/6;}
        }
    }
else
    {if (U > W)
        {m=W; d=V-W; f1=(1+(U-V)/V)/2; f2=(1+(V-U)/V)/2; f3=0;}
    else
        {if (V > W)
            {m=U; d=V-U; f1=0; f2=((V-U-W)/V+2)/3; f3=0;}
        else
            {if(W!=0)
                {m=U, d=W-U; f1=((U-V-W)/W+2)/3; f2=((V-U-W)/W+2)/3; f3=(1-V/W)/6;}
            else
                {m=0; d=0; f1=0; f2=0; f3=1;}
            }
        }
    }
```

The mapping then modifies the values f1, f2 and f3 which represent the mapping for the most saturated color. The f1, f2 and f3 values are altered by m and d to give the proper lightness and saturation behavior. The amounts of the two-highlight colorants (h1 and h2) are given by:

h1=f1·d; and h2=f2·d.

The amount of white for the most saturated color (ws) is:

ws=1−f1−f2−f3.

The amount of white in the final mapped color (w) is:

w=ws·d+m.

The amount of black colorant (k) will thus be:

k=max(0,1−h1−h2−w).

The mapping described above works for arbitrary colorants, except for opposing colors, such as red and cyan. In that case, the transformation into the UVW coordinates cannot be defined. These cases can be handled by artificially perturbing one of the colorant coordinates away from the singular case.

For pictorial applications, it is important to preserve luminance. Luminance accounts for white and black, but luminance also includes the eye sensitivity to different hues. For example, blues look darker than yellows. While a picture is quite recognizable, dark hues such as blue may be mapped to lighter colors than light hues such as yellow. Even more significant are some unpleasant color shifts. For example, when blue highlight color is used, unnatural blue fleshtones can be obtained in a mapped highlight color image.

Full color pictorial images can also be mapped into arbitrary highlight colors while preserving luminance and including no more of a highlight color than was present in the full color image.

In pictorial images, the mapping should not specify more of the highlight colors than is present in the original sample. To achieve this, however, how much of one color is present in another color must be defined. This can be achieved by expressing colors in the original full color image and in the two highlight colors in the YES coordinate system.

In this coordinate system, Y is the luminance, while E and S are the chrominance components. The E coordinate is the red-green scale; the S coordinate is the yellow-blue scale. Using the YES coordinate system, the measure of color similarity is based on the chrominance components. The Y, E and S values are determined as:

Y=0.253r+0.684g+0.063b;

E=(r−g)/2; and

S=(r+g)/4−b/2;

where r is the amount of red in the image; g is the amount of green in the image; and b is the amount of blue in the image. Each of these coordinates is determined for each of the highlight colors and the sample color of the full color image.

If the two highlight colors are referred to as H1 and H2, their color coordinates can be measured and transformed into YES values. After the transformation, the luminance of the highlight colors H1 and H2 are labeled as $Y_{H1}$ and $Y_{H2}$, respectively. Similarly, the chrominance vectors are $[E_{H1}, S_{H1}]$ and $[E_{H2}, S_{H2}]$, respectively. For a particular source color $Y_S$, $E_S$, $S_S$, this invention determines the amount of color to use for the two highlight colors H1 and H2, and black. The amount of each highlight color in this mapping is proportional to the cube of the cosine of the angle between the chrominance components of the source color and the highlight color, and the magnitude of the source chrominance relative to that of the highlight color chrominance. The amount of highlight color is calculated as:

$h_1=(E_S E_{H1}+S_S S_{H1})^3/((E_S^2+S_S^2) E_{H1}^2+S_{H1}^2)^2)$ $h_2=(E_S E_{H2}+S_S S_{H2})^3/((E_S^2+S_S^2) (E_{H2}^2+S_{H2}^2)^2)$.

Enough white must be added to make up the difference between the luminance desired and the luminance contributed by the two highlight colors. Thus:

$w=Y_S−Y_{H1}·Y_{H2}·h_2$.

Black is thus the area which is not a highlight color or white:

$k=1−h_1−h_2−w$.

All values should be clamped to the physically meaningful range of 0 to 1.

Figure 7:
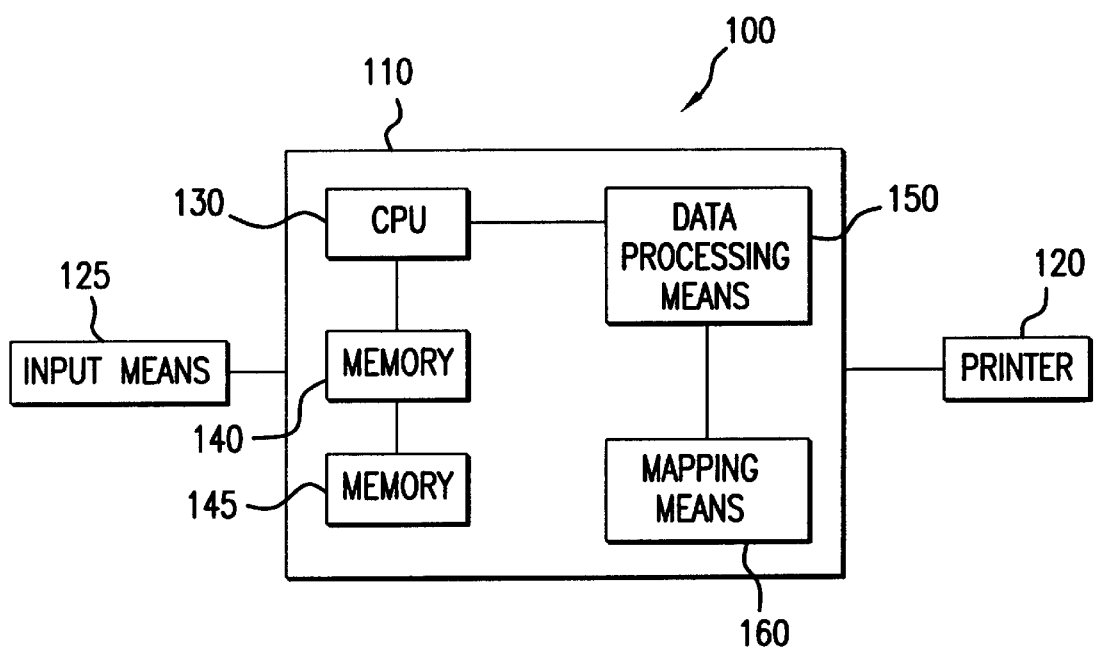
FIG. 7 illustrates a block diagram of a device for mapping a full color image to a two-highlight color image.

FIG. 7 is a block diagram of a system 100 representative of the invention. The system 100 includes a programmed general purpose computer 110, a printer 120 and input means 125 for inputting a full color image. The computer 110 may also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such a PLD, PLA or PAL, or the like. Input means 125 may be for example a scanner. The printer 120 is coupled to the computer 110 in a conventional manner. The computer 110 includes a CPU 130, a memory element 140 for storing a control program, a memory element 145 and data processing means 150. The memory elements 140 and 145 may be static or dynamic RAM or some type of ROM. The system also includes processing means 150. In accordance with the control program, the processing means 150 generates values for a color space corresponding to a complete set of possible colors for the highlight color printer 120. The processing means 150 further determines a location of a fully saturated color and a generated color space corresponding to a hue from the full color image. The system 100 further includes mapping means 160 for mapping the generated color space to a space of printable colors defined by the hue of the full color image. The processing means 150 converts colors of the full color image to the UVW coordinate system or the YES coordinate system, depending upon the type of full color image.

When the source color is converted to the UVW system, the processing means 150 determines the most saturated color, a first highlight color amount in the most saturated color, a second highlight color amount in the most saturated color and a black amount. Thereafter, the first highlight color amount in the most saturated color, the second highlight color amount in the most saturated color and the black amount are altered to preserve luminance and saturation with respect to the full color image. The altered amounts represent the amounts of the first highlight color and the second highlight color to be used in printing out the two highlight color image. Once the first highlight color amount, the second highlight color amount and black are determined, these values are sent to the printer 120 for outputting an image.

The mappings from full color to two-highlight-color, as described above, provide excellent results for both pictorial image application and presentation graphic applications. The shades and tints for each hue are mapped to a corresponding triangle of colors in the tetrahedral section 4 formed by the triangular planes of the two highlight hues. The apex 24 of the triangle 22 of resulting colors 18 and 20 varies within the tetrahedral section 4 of possible result colors according to a hue. Differentiations are provided in the resulting color for the fully saturated cases while preserving relative saturation and lightness behavior. The triangle 22 of resulting colors can exactly match a triangle of possible colors when the original hue matches one of the highlight hues. Thus, highlight colors can be specified in a manner consistent with full color specifications.

There may be instances when a full color image includes more than one type of image object or region, i.e. both pictorial and presentation elements. Each of the objects or regions will require mapping to the appropriate available printable colors. Regardless of whether the mapping is applied when the page is assembled or applied at a later point in time, the object or region type information can be used to identify the type of mapping used on a particular portion of the full color image. Specifically, if the image portion is identified as a pictorial type, the pictorial mapping will be applied to that portion of the image and if the image portion is identified as a presentation type, the presentation mapping will be applied. This allows for the highest degree of fidelity between a multi-type full color image and a corresponding two-highlight color image.

While this invention has been described in conjunction with the specific embodiments outlined above, it is evident that many alternatives, modifications and variations will be apparent to those skilled in the art. For example, the color mappings can be used for three-color printers as well as two-highlight color printers. In three-color printers, there may also be limitations which make mappings useful.

Accordingly, the preferred embodiments of the invention as set forth herein are intended to be illustrative, not limiting. Various changes may be made without departing from the spirit and scope of the invention as defined in the following claims.

We claim:

1. A method of converting a full color image to a two-highlight color image producible by a two-highlight color printer comprising the steps of:
   defining a substantially tetrahedral color space comprising a complete set of possible colors for the two-highlight color printer;
   determining a hue for any given color in the full color image;
   defining a triangle of printable colors, being a subset of the tetrahedral color space, for the hue for any color in the full color image; and
   mapping the given color to a point in the triangle.

2. The method of claim 1, wherein the full color image includes at least two object types requiring different mapping and further comprising identifying regions having each of the at least two object types and selectively converting the regions dependent upon an identified type.

3. The method of claim 1, wherein the triangle of printable colors is defined according to an amount of the two highlight colors present in the full color image.

4. The method of claim 1, wherein the triangle of printable colors is defined by vertices of a first color white, a second color black and a third color.

5. A method of claim 4, wherein the third color is dependent upon the hue.

6. A method of mapping a full color image to a two-highlight-color image producible by a printer comprising the steps of:
   converting a source color, of numerous possible colors, of the full color image to a special color coordinate system (U V W);
   determining a most saturated color of the source color;
   determining a first highlight color amount present in the most saturated color (f1) based upon the converted source color coordinate;
   determining a second highlight color amount present in the most saturated color (f2) based upon the converted source color coordinate;
   determining a black amount in the most saturated color (f3) based upon the converted source color coordinate; and
   altering the first highlight color amount, the second highlight color amount and the black amount to preserve lightness and saturation behavior from the full color image.

7. The method of claim 6, wherein the special coordinate system has three coordinates, a first coordinate of the special coordinate system representing a strength of the source color in the first highlight color and a second coordinate of the special coordinate system representing the strength of the source color in the second highlight color.

8. The method of claim 6, further comprising converting the source color from ($R_S$, $G_S$, $B_S$) to (U V W) by a transformation M.

9. The method of claim 8, further comprising:
   defining a minimum of the coordinates (U V W) as an amount of white (m) present in the two highlight color image, the difference between the maximum of the three components of the coordinates (U V W) and the minimum of the three components of the coordinates (U V W) is taken as an amount of chrominance (d) present in the two-highlight color image.

10. A method as recited in claim 9, further comprising:
    defining the amount of first highlight color in the most saturated color (f1), the amount of second highlight color in the most saturated color (f2) and black in the most saturated color (f3) in the two-highlight color image based upon a relationship between the three components of the coordinates (U V W).

11. A method as recited in claim 10, wherein the first highlight color amount present in the most saturated color is altered in accordance with the amount of chrominance present in the two-highlight color image, the second highlight color amount present in the most saturated color is altered in accordance with the amount of chrominance in the two-highlight color image, the amount of white for the most saturated color in the two-highlight color image (ws) is determined by (1−f1−f2−f3), the amount of white in the final mapped color (w) is determined by ws*d+m and the amount of black is selected from the greater of zero and (1−h1−h2−w).

* * * * *